United States Patent [19]
Sorrels

[11] 3,768,445
[45] Oct. 30, 1973

[54] ADJUSTABLE ANIMAL HARNESS
[76] Inventor: Delmar Lynn Sorrels, 4412–37th Avenue, Sacramento, Calif. 95824
[22] Filed: Mar. 27, 1972
[21] Appl. No.: 238,436

[52] U.S. Cl. .................................. 119/109, 54/85
[51] Int. Cl. ........................................... A01k 01/06
[58] Field of Search ................ 119/109, 96; 54/24, 54/85

[56] References Cited
UNITED STATES PATENTS

| | | | |
|---|---|---|---|
| 3,099,250 | 7/1963 | Soles, Jr. | 119/109 X |
| 2,800,104 | 7/1957 | Cameron et al. | 119/109 X |
| 2,605,744 | 8/1952 | Urbanski | 119/96 |
| 2,703,553 | 3/1955 | Cooke | 119/109 X |

FOREIGN PATENTS OR APPLICATIONS

| | | | |
|---|---|---|---|
| 1,027,045 | 4/1966 | Great Britain | 119/109 |

Primary Examiner—Louis G. Mancene
Assistant Examiner—James H. Czerwonky
Attorney—Stephen S. Townsend et al.

[57] ABSTRACT

An animal leash harness for a quadruped composed of an adjustable chest strap and an adjustable girth strap adapted for overlapped engagement along the back of the quadruped. The harness is positioned on the animal by bringing it down in front of the animal's head in an arc that terminates just above the animal's feet. Instinctively, the animal raises his feet whereby the harness can be brought up around its front legs and the buckle assembly engaged. One portion of the harness has an elongated leash hook slot and another portion is provided with a leash hook. The outer dimension of the hook is greater than the length of the slot.

8 Claims, 5 Drawing Figures

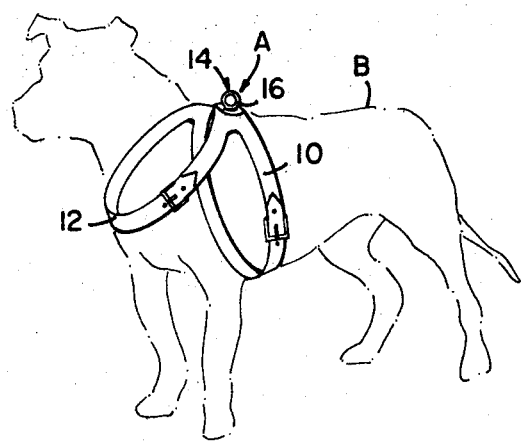
FIG_1
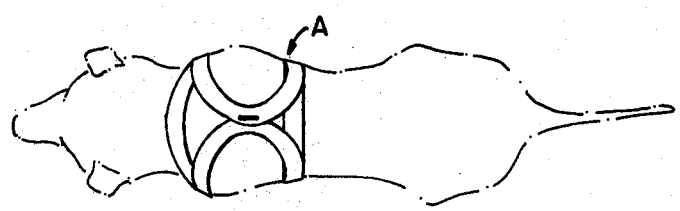
FIG_2
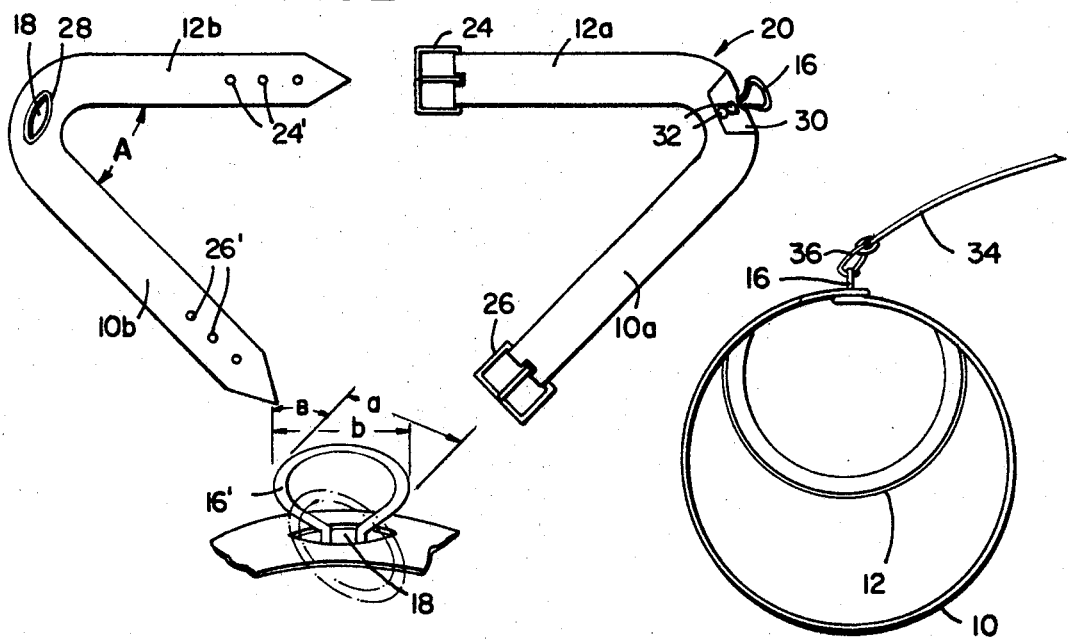
FIG_3
FIG_5  FIG_4

ADJUSTABLE ANIMAL HARNESS

One of the principle shortcomings of conventional animal harnesses is that the animal has to remain generally stationary for a significant period of time while the harness is attached around or over the dog's neck and/or girth. With an active animal, especially one having significant size and weight, this becomes a difficult task for a person of slender build, particularly when employing a harness such as depicted in U. S. Pat. No. 2,187,021, that has to be placed over the animal's head.

The present invention relates to an improved animal harness especially suitable for use with a dog or other quadruped. The present invention is directed to a device adapted to encircle both the animal's neck and girth without requiring that the harness be placed over the animal's head. More particularly, the present invention is directed to a harness of special parabolic design that when positioned on the animal approximates an ordinary harness both in function, shape and general appearance.

It is a principle object of the present invention to provide an improved harness which can readily be positioned around the front legs of an animal such as a dog or a cat.

Another object is to provide a harness of the type described wherein but a single fastening means is required to secure it on an animal.

It is another object of our invention to provide a simple, strong and attractive harness that can be easily adjusted to fit the neck as well as the body of a quadruped in a comfortable manner.

It is a further object of the present invention to provide a novel harness wherein a continuous loop of flexible material is adapted to encircle the front legs of an animal and be drawn up over the back of the animal and fastened together thereover to form both a neck and girth band. Various conventional means are contemplated for fastening the loop together along the back of the animal.

Other objects, features and advantages of the present invention will become more apparent after referring to the following specification and accompanying drawings in which:

FIG. 1 is a perspective view of the dog harness comprising the present invention with a canine shown in phantom;

FIG. 2 is a top view of FIG. 1;

FIG. 3 is a plan view of the harness in dismounted and opened out condition;

FIG. 4 is an end view of the assembled harness of FIG. 1; and

FIG. 5 is an enlarged fragmentary view of FIG. 1 depicting a further embodiment of a metal connector assembly.

Turning now to the drawings wherein similar characters of reference represent corresponding parts in each of the several views, in FIGS. 1 and 2 an animal harness embodying one form of the invention is shown, designated generally at A, positioned around a dog B shown in phantom. Harness A comprises body (girth) strap 10, neck strap 12 and overlapping buckle 14. Straps 10 and 12 can be formed of any conventional material such as leather, plastic, heavy cloth and the like, which can be studded, unstudded, single or doubled and stitched.

Buckle assembly 14, preferably of tempered metal, includes leash hook 16 adapted to be inserted through slot 18. Harness A is preferably formed in two sections, section 20 including a leash hook and composed of neck strap 12a and chest strap 10a. Section 22 includes leash hook slot 18 and is formed of neck strap 12b and chest strap 10b. Sections 20 and 22 are preferably formed so that angle A is of approximately 45°. In this manner, the harness conforms closely to the anatomy of the animal.

Straps 12a and 10a are provided at the free ends thereof with conventional metal connectors 24 and 26 for releasable engagement in mutually overlapping relation with various of a plurality of spaced apertures 24' and 26' in corresponding of members 12b and 10b, for adjustment in the overall neck and girth dimensions of harness A. In this manner, the harness may be adjustably tightened around the neck and girth of the animal, once placed in position with buckle assembly 14 engaged. Furthermore, the harness can be adjusted to fit animals of different size. It is also contemplated to fabricate the harness in different sizes.

In FIG. 3, leash hook 16 is depicted as being pivotally secured in mounting plate 30 attached to section 20 by conventional attaching elements such as rivets 32. However, it will be apparent to one skilled in this art that leash hook 16 can also be formed integral with attaching member 30 and at a right angle thereto. Furthermore, in the embodiment of FIG. 3, the length of slot 18 is illustrated as being greater than the width of leash hook 16.

However, as depicted by FIG. 5, a further buckle assembly involves a variation wherein the harness will remain positioned upon the animal until intentionally removed. Thus, leash hook 16' is formed so that its width $b$, the dimension perpendicular to mounting plate 30, is greater than the length of slot 18. However, leash hook 16' is also fabricated to include a dimension $a$ of lesser width than dimension $b$ and additionally of lesser width than slot 18. This dimension $a$ enables leash hook 16' to be inserted through slot 18 only by turning hook 16' at an angle B. In this manner, once hook 16' is disposed through slot 18, it can only be removed by again turning the hook relative to the plane of slot 18. This embodiment creates a locking position for hook 16' with respect to slot 18 that will retain the harness on the animal irrespective of the presence of a leash. By way of typical example of this embodiment, hook 16' is formed as an ovoid ring with dimension $b$ fabricated to be 7.1 millimeters while dimension $a$ is fabricated to be 5.8 millimeters. Slot 18 is formed of a length of 6.0 millimeters. By introducing hook 16' into slot 18 with dimension $a$ normal to the length of slot 18, i.e., with the hook at approximately 30° to the slot, the engagement can be accomplished. Furthermore, removal is limited to retraction at the foregoing angle.

As illustrated more fully in FIG. 4, leash hook 16 is adapted to have attached thereto a leash 34 including a releasable snap 36. Slot 18 is preferably provided with a metal grommet 28 for reinforcing the opening therein.

In use, the animal's feet are placed within the harness loop and the two ends are brought up over the animal's back with the slot 18 overlapping the hook 16. The hook is introduced into slot 18 and leash 34 attached thereto by releasable snap 36. To remove, the leash is unsnapped, thereby enabling the harness to fall free of the animal, except where a special hook and slot is utilized such as depicted in FIG. 5.

While preferred embodiments of this invention have been illustrated and described, it will be appreciated by one skilled in this art that various changes and modifications may be made within the scope of the invention as defined in the appended claims.

What is claimed is:

1. A leash harness for an animal, comprising a loop of flexible material having a front and rear portion and a pair of side portions, said loop being adapted to receive the front feet of an animal therein and be drawn up around the body and neck of said animal, one of said pair of side portions being provided with a leash hook, the other of said pair of side portions being provided with an elongated leash hook slot, said leash hook having an outer dimension greater than the length of said slot and being formed so as to create a locking position with respect to said leash hook slot when inserted therein, whereby positioning said animal's front feet within said loop and engaging said hook in said slot above said animal's back will releasably secure said harness around said animal.

2. A leash harness in accordance with claim 1 wherein said front and rear portions are provided with means for independently adjusting the length of respective of said portions.

3. A leash harness in accordance with claim 2 wherein each of said independently adjusting means comprises a buckle connector and a plurality of spaced apertures.

4. A leash harness in accordance with claim 1 wherein said leash hook has a width greater than the length of said leash hook slot, but has an angular dimension of lesser width than the width of said leash hook slot so that said leash hook is adapted for angular insertion through said leash hook slot.

5. A leash hook in accordance with claim 4 wherein the leash hook is formed so that the angle of insertion through said leash hook is approximately 30°.

6. A leash harness in accordance with claim 1 wherein said front portion comprises a neck strap and said rear portion comprises a girth strap.

7. A leash harness in accordance with claim 6 wherein said neck strap and said girth strap are angularly disposed with respect to each other.

8. A leash harness in accordance with claim 7 wherein said angle is approximately 45°.

* * * * *